A. J. KERCHER.
METHOD OF MAKING PRESSURE CELLS.
APPLICATION FILED NOV. 9, 1915.
1,198,134. Patented Sept. 12, 1916.
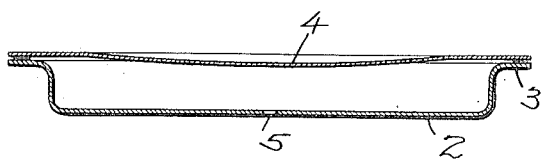
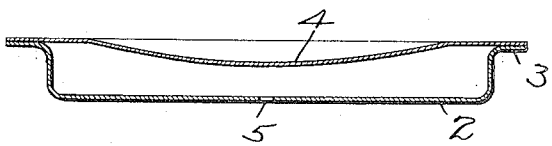
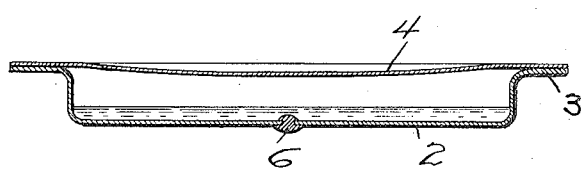
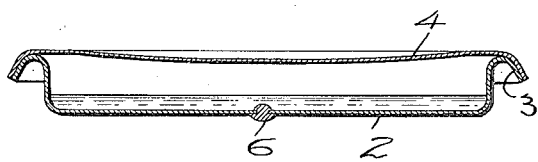
WITNESS
J. B. Gardner
INVENTOR.
ARTHUR J. KERCHER.
BY White & Prost
HIS ATTORNEYS.

UNITED STATES PATENT OFFICE.

ARTHUR J. KERCHER, OF BERKELEY, CALIFORNIA.

METHOD OF MAKING PRESSURE-CELLS.

1,198,134.  Specification of Letters Patent.  Patented Sept. 12, 1916.

Application filed November 9, 1915. Serial No. 60,504.

*To all whom it may concern:*

Be it known that I, ARTHUR J. KERCHER, a citizen of the United States, and a resident of Berkeley, county of Alameda, and State of California, have invented a certain new and useful Method of Making Pressure-Cells, of which the following is a specification.

The invention relates to a method of making a pressure cell having a wall formed of a buckling diaphragm which springs in or out due to variations in pressure within the cell.

An object of the invention is to provide a method of making a pressure cell of the class described in which the buckling diaphragm has a predetermined throw.

Another object of the invention is to provide a method of making a pressure cell of the class described having a buckling diaphragm which springs at a predetermined pressure.

The invention possesses other advantageous features, some of which, with the foregoing, will be set forth at length in the following description, where I shall outline in full that form of the invention which I have selected for illustration in the drawings accompanying and forming part of the present specification.

In the drawings I have shown only one specific form of the invention and it is to be understood that the invention may be embodied in a multiplicity of forms, each being a species of my invention.

In the drawings: Figures 1, 2 and 3 show three successive stages in the manufacture of the pressure cell. Fig. 4 shows an alternative method of performing the functions of the step shown in Fig. 3.

The cell comprises a cup or dished plate 2 preferably made of copper, having a flanged edge 3 to which is welded a buckling diaphragm 4, also preferably made of copper and somewhat thinner than the metal of the cup. The cup is provided with an aperture 5, through which a quantity of ether or other volatilizable liquid is introduced into the cell after the diaphragm has been welded and the aperture is then closed with a quantity of suitable solder 6, so that the cell is hermetically sealed.

A ring of silver flux is placed between the diaphragm and the flange on the cup, so that a hermetically tight joint is formed in welding, which will not open when pressure is produced in the cell. The buckling diaphragm is welded to the cup electrically by incandescent carbons. The buckling diaphragm is tempered before it is welded to the cup and in order to prevent the heat of welding from drawing the temper from the buckling portion of the diaphragm, such portion is kept cold during the welding operation. This is usually accomplished by placing a thick, wet disk of felt or other absorbent material of slightly greater diameter than the buckling portion of the diaphragm on the buckling portion during the welding operation. The subsequent cooling of the periphery of the diaphragm and cup causes the periphery to contract and the buckling portion is bowed to a greater extent than it originally was, thereby altering its throw and varying its pressure resisting qualities.

The throw or distance of movement of the diaphragm is an important consideration in the operation of devices which are operated by the movement of the diaphragm and the amount of the throw must frequently be equal to a certain predetermined distance.

My invention contemplates the provision of a method of adjusting the throw and the pressure resisting qualities of the buckling diaphragm after it has been welded to the cup. This is accomplished by stretching the peripheral portion of the diaphragm outward, which operation stretches the diaphragm and pulls out on the buckling portion, thereby lessening the throw of such portion and varying its pressure resistance. This stretching operation may be accomplished by rolling out the welded edges of the cup and diaphragm, as shown in Fig. 3, or it may be accomplished by rolling down the welded edges as shown in Fig. 4. The stretching operation is continued until the desired throw or pressure resistance of the buckling portion has been obtained. When the diaphragm is to be operated by pressure produced within the cell by an increase in temperature, the cell is then charged with a quantity of suitable liquid and sealed. When the diaphragm is to be operated by variations in pressure produced externally of the cell, the liquid may be omitted, in which case the cell is connected by a sealed conduit with the source of pressure. The cell thus formed is capable of use in a multitude of instances, principally in devices which are to be controlled in some manner by variations in temperature or pressure. An increase in temperature produces an increase in pressure within the cell and a predetermined temperature produces a pressure sufficient to buckle the diaphragm, causing other devices to be operated which control the temperature.

I claim:

1. The method of making a pressure cell, which consists in welding the peripheral portion of a buckling diaphragm to a metallic cup and stretching the peripheral portion of the diaphragm.

2. The method of making a pressure cell, which consists in welding the peripheral portion of a buckling diaphragm to a metallic cup and maintaining the buckling portion of the diaphragm cold during the welding operation and subsequently stretching the peripheral portion of the diaphragm.

3. The method of making a pressure cell, which consists in welding the peripheral portion of a buckling diaphragm to a metallic cup and subsequently stretching the welded joint.

4. The method of making a pressure cell, which consists in welding the peripheral portion of a buckling diaphragm to a metallic cup while maintaining the buckling portion cold, whereby cooling of the weld causes the degree of curvature of the buckling portion to increase and then stretching the welded joint.

In testimony whereof, I have hereunto set my hand at San Francisco, California, this 3rd day of November, 1915.

ARTHUR J. KERCHER.

In presence of—
H. G. PROST.